(12) United States Patent
Hausmann et al.

(10) Patent No.: US 7,740,952 B2
(45) Date of Patent: Jun. 22, 2010

(54) COMPOSITION COMPRISING BIOPOLYMER

(75) Inventors: Karlheinz Hausmann, Auvernier (CH);
Peter A. Morken, Wilmington, DE (US); Kishan Chand Khemani, Williamstown (AU); Paul Anthony Perry, Port Melbourt (AU)

(73) Assignee: Plantic Technologies Limited, Altona, Victoria (AU)

( * ) Notice: Subject to any disclaimer, the term of this patent is extended or adjusted under 35 U.S.C. 154(b) by 133 days.

(21) Appl. No.: 12/020,318

(22) Filed: Jan. 25, 2008

(65) Prior Publication Data

US 2008/0182113 A1 Jul. 31, 2008

Related U.S. Application Data

(60) Provisional application No. 60/897,628, filed on Jan. 26, 2007.

(51) Int. Cl.
*B32B 5/66* (2006.01)
(52) U.S. Cl. .......... 428/522; 428/532; 524/47; 524/52
(58) Field of Classification Search ........ 428/522, 428/532; 524/47, 52
See application file for complete search history.

(56) References Cited

U.S. PATENT DOCUMENTS 5,026,745 A 6/1991 Weil
5,095,054 A 3/1992 Lay
5,314,934 A 5/1994 Tomka
5,409,973 A 4/1995 Bastioli
5,510,401 A 4/1996 Dehennau
5,627,223 A 5/1997 Dehennau
5,635,550 A 6/1997 Dehennau
6,242,102 B1 6/2001 Tomka
2004/0242732 A1 12/2004 Yu
2006/0194902 A1 8/2006 Nie et al.
2006/0293419 A1 12/2006 Yu
2007/0148383 A1 6/2007 Yu

FOREIGN PATENT DOCUMENTS

EP 0471402 2/1992
EP 0561060 * 9/1993
WO 0036006 A1 6/2000
WO 2006042364 A1 4/2006

OTHER PUBLICATIONS

D. Bikiaris and C. Panayiotou, LDPE/Starch Blends Compatibilized with PE-g-MA copolymers, Journal of Applied Polymer Science, 1998, vol. 70, p. 1503-1521.
International Search Report for International Application No. PCT/US2008/000971 dated Jun. 17, 2008.

* cited by examiner

*Primary Examiner*—Leszek Kiliman
(74) *Attorney, Agent, or Firm*—Kilyk & Bowersox, P.L.L.C.

(57) ABSTRACT

Disclosed is a composition comprises or is produced from a biopolymer, an olefin copolymer, and an optional polymer wherein the biopolymer comprises repeat units derived from a glycoside. Also disclosed is an article comprising or produced from the composition.

20 Claims, No Drawings

COMPOSITION COMPRISING BIOPOLYMER

This application claims priority to U.S. provisional application Ser. No. 60/897,628, filed Jan. 26, 2007, the entire disclosure of which is incorporated herein by reference.

The invention relates to a composition comprising starch and an ethylene copolymer that can be used as compatibilizer for a polymer or an article therewith.

BACKGROUND OF THE INVENTION

Biodegradable polymers such as polymers from glycosides, poly(lactic acid), polyvinyl alcohol, polycaprolactone, have a broad range of industrial and biomedical applications as films. However, articles made from these materials or the films often suffer deficiencies such as brittleness, poor impact strength, poor tear strength, poor clarity, water sensitivity, poor processability, etc. In many instances selected deficiencies can be improved by preparing blends of biopolymers with other biopolymers or synthetic polymers. A problem associated with blending biopolymers is compatibility with other polymers, especially less polar polymers. Orientation with strain assisted crystallization of amorphous polymers may be used to increase the stiffness or modulus of films as well as elongation. Such orientation process decreases the elongation-at-break in the direction of the lower orientation.

Also, utilization of starch polymers is attractive due to the renewable nature and the compostability, which eases burdens on landfills, but articles fabricated from starch are very brittle, and this poor impact toughness limits commercial applications of pure starch articles. Starch can be blended with a variety of polymers to improve the properties of starch, but as the starch content increases the tensile strength and elongation at break both decrease. See, Bikiaris (D. Bikiaris and C. Panayiotou, Journal of Applied Polymer Science, 1998, vol 70, p. 1503). Anhydrous plasticized starch blended with polyethylene has been compatibilized with maleic anhydride-grafted polyethylene (Bikiaris). See also, WO2006042364. Maleic anhydride-grafted polyethylene has also been used in starch alloys containing 20 to 80% starch (e.g., U.S. Pat. No. 5,635,550) and in a blend of destructurized starch (e.g., U.S. Pat. No. 5,409,973).

It would also be desirable to produce articles from resin compositions with >80% starch content thereby improving the biodegradability of the resulting resin composition. These articles are more difficult to toughen because they comprise a higher proportion of the brittle starch and could also have the brittle starch as the continuous or co-continuous phase. For example, use of hydroxypropyl-modified, high-amylose starch in combination with less than 10% polyvinyl alcohol has been described (WO 00/36006). However, these articles have inferior impact properties, particularly at <40% relative humidity.

Accordingly, it is desirable to develop a modified composition, and its blends, with improved processability and physical properties and to articles made from the composition or from a multilayer structure comprising the composition.

SUMMARY OF THE INVENTION

A composition comprises, consists essentially of, consists of, or is produced from a biopolymer, an olefin copolymer, and an optional polymer wherein the biopolymer includes a hydroxyalkyl-modified starch and is present in the composition in a concentration of at least 85%, based on the total dry weight of the composition;

the olefin copolymer is produced by copolymerization of an olefin, a monomer, and optionally a comonomer;

the olefin includes ethylene, propylene, butylene, or combinations of two or more thereof;

the monomer includes maleic anhydride, maleic acid, salt of maleic acid, maleic acid diester, maleic acid monoester, itaconic acid, fumaric acid, fumaric acid monoester, or combinations of two or more thereof;

the optional comonomer includes (meth)acrylic acid, salt of (meth)acrylic acid, $C_1$-$C_8$ ester of (meth)acrylic acid, carbon monoxide, sulfur dioxide, acrylonitrile, glycidyl acrylate, glycidyl methacrylate, and glycidyl vinyl ether, or combinations of two or more thereof; and the optional polymer includes ethylene alkyl(meth)acrylate copolymer, ethylene vinyl acetate copolymer, ethylene acid copolymer or ionomer thereof, poly(vinyl alcohol), poly(hydroxyalkanoic acid), polyester, polyamide, polyurethane, polyolefin, polycaprolactone, copolyetherester, polyalkylene oxide, or combinations of two or more thereof.

A process comprises mixing a biopolymer, an olefin copolymer, and an optional polymer and optionally an additive to produce a mixture, introducing water to the mixture to produce another mixture, and extruding the another mixture at an elevated temperature wherein the biopolymer, the olefin copolymer, and the optional polymer are as disclosed above and the introduction of water can be carried out prior to, or substantially contemporaneously with, the extruding.

An article comprises or is produced from a composition that can be the same as disclosed above.

DETAILED DESCRIPTION

The biopolymer comprises repeat units derived from glycoside, which includes one or more substances containing or joined by glycosidic bonds. Glycosidic bond can join two or more monosaccharides such as glucose or fructose to form a disaccharide or polysaccharide. Polysaccharide includes starch, glycogen, cellulose, chitin, or combinations of two or more thereof.

Starch occurs in two forms, α-amylose and amylopectin. The mole ratio of amylose to amylopectin can be in the range of from about 0.1:1 to about 10:1, about 0.5:1 to about 5:1, or about 1:2 to about 2:1. Starch can be present in nonionic, cationic, anionic, or amphoteric form. Starch of interest includes one comprising repeat units derived from at least 65%, 70%, 75%, 80%, or 85% of amylose, by weight of the starch.

Polysaccharides can be modified in many ways for industrial uses, such as acid-, oxidation-, hydroxyalkyl-, enzyme-, ester-, and phosphate-modified.

For example, cationic starch may be derived from any common starch producing materials such as corn starch, potato starch, waxy maize starch and wheat starch. Amphoteric starch includes naturally occurring starch such as potato starch or synthetic amphoteric starch. Cationization can be achieved by any of known commercially known procedures, such as addition of 3-chloro-2-hydroxypropyltrimethylammonium chloride to obtain cationic starches with various degrees of nitrogen substitution.

Starch also includes modified starch made by hydrolysis with acid, enzyme, or combinations thereof. Modified starch, based on degree of hydrolysis quantified by dextrose equivalents, can include maltodextrin, corn syrup, dextrin, or combinations of two or more thereof.

Modified starch can also include starch obtained by mixing starch solution or dispersion with an aqueous solution or dispersion of at least one amphoteric or cationic with at least one polyacrylamide which can be nonionic, amphoteric, cationic, or anionic polyacrylamide as disclosed in U.S. Pat. Nos. 5,859,128, 5,928,474, 6,048,929 and 6,699,363 as well as US20040242732, US20060293419, and US20070148383, entire disclosures thereof are incorporated herein by reference.

For example, a modified starch can comprise, consist essentially of, consist of, or be produced from about 80 to about 95%, about 82 to about 95%, about 85 to about 95%, or about 88 to about 92%, or about 90%, by weight of a modified starch which comprises or is modified to include an hydroxyalkyl $C_{2-6}$ group (e.g., hydroxypropylated high amylose starch) or modified by reaction with an anhydride of a dicarboxylic acid. The degree of substitution (e.g., the average number of hydroxyl groups in a unit that are substituted) can be about 0.01 to about 5 or about 0.05 to about 2. The composition can also include about 1 to about 15% or about 5 to about 10% by weight of a water soluble polymer such as polyvinyl alcohol, a copolymer of polyvinyl alcohol, or combinations thereof. The starch can further include 0 to about 40% or 0 to about 20% or about 0.01 to about 15% by weight of a polyol plasticizer such as glycerol or diglycerol and about 0.1 to 2% by weight of a $C_{12-22}$ fatty acid or salt thereof such as stearic acid or salt thereof and 0 to about 12% water. Example of modified starch includes hydroxyethyl starch, hydroxypropylated starch, hydroxybutyl starch, hydroxyether starch, maleic phthalic starch, octenyl succinic anhydride starch, hydroxyamyl starch, hydroxyether starch, hydroxypropylated amylose, or combinations of two or more thereof. Preferred is hydroxypropylated starch. The modified starch is disclosed in US20040242732, which also discloses a method for its preparation.

Other biopolymers can include hemicellulose, pectin, Glycogen, Cellulose, Chitin, lignin, agar, alginic acid or salt thereof, gum Arabic, xanthan gum, poly(hydroxyakanoic acid), or combinations of two or more thereof.

Glycogen has about 60,000 glucose repeat units with molecular weight of about $10^6$-$10^7$ daltons. It is a commercially available animal polysaccharide.

Cellulose and its derivatives are readily available commercially and the most abundant structural and cell wall polysaccharide. Cellulose derivatives can include cellophane, hydroxymethyl cellulose, hydroxyethyl cellulose, hydroxypropyl cellulose, hydroxyethyl methylcellulose, hydroxypropyl methyl cellulose, cellulose ester (e.g., cellulose acetate, cellulose triacetate, inorganic ester nitrocellulose), carboxymethy cellulose, or combinations of two or more thereof.

Chitin, a polymer of N-acetyl glucosamine and major structural element in hard, horny exoskeletons of insects and crustaceans, is also commercially available.

The monomer can include maleic anhydride, maleic acid, salt of maleic acid, maleic acid diester, maleic acid monoester, itaconic acid, fumaric acid, fumaric acid monoester, or combinations of two or more thereof. Examples of monomers include methyl hydrogen maleate, ethyl hydrogen maleate, propyl hydrogen maleate, butyl hydrogen maleate, or combinations of two or more thereof. The monomers can be present in concentration of about $\geq 2$ wt %, $\geq 4$, $\geq 6$, $\geq 8$, or $\geq 10\%$, by weight.

The optional comonomer includes (meth)acrylic acid, salt of (meth)acrylic acid, $C_1$-$C_8$ alkyl (meth)acrylate, carbon monoxide, sulfur dioxide, acrylonitrile, glycidyl acrylate, glycidyl methacrylate, and glycidyl vinyl ether, or combinations of two or more thereof. (Meth)acrylic acid includes acrylic acid, methacrylic acid, or both and (meth)acrylate includes acrylate, methacrylate, or both. A salt of (meth) acrylic acid can include any metal salt. Examples of alkyl include methyl, ethyl, propyl, butyl, or combinations of two or more thereof, and alkyl groups $\geq 3$ carbons may be linear or branched in structure. The comonomer may be incorporated into the olefin copolymer from 0.1 weight % up to 45 weight % of the total copolymer.

Examples of the olefin copolymer include copolymer of ethylene and methyl hydrogen maleate, copolymer of ethylene and ethyl hydrogen maleate, copolymer of ethylene and propyl hydrogen maleate, copolymer of ethylene and butyl hydrogen maleate, copolymer of propylene and methyl hydrogen maleate, copolymer of propylene and ethyl hydrogen maleate, copolymer of propylene and propyl hydrogen maleate, copolymer of propylene and butyl hydrogen maleate, copolymer of ethylene, methyl acrylate and methyl hydrogen maleate, copolymer of ethylene, methyl acrylate and ethyl hydrogen maleate, copolymer of ethylene, methyl acrylate, and propyl hydrogen maleate, copolymer of ethylene, methyl acrylate, and butyl hydrogen maleate, copolymer of ethylene, ethyl acrylate, and methyl hydrogen maleate, copolymer of ethylene, butyl acrylate, and methyl hydrogen maleate, copolymer of ethylene, butyl acrylate, and ethyl hydrogen maleate, copolymer of ethylene, ethyl methacrylate, and methyl hydrogen maleate, copolymer of ethylene, butyl methacrylate, and methyl hydrogen maleate, copolymer of ethylene, butyl methacrylate, and ethyl hydrogen maleate, copolymer of ethylene, ethyl acrylate, and maleic anhydride, copolymer of ethylene, butyl acrylate, and maleic anhydride, copolymer of ethylene, butyl methacrylate, and maleic anhydride, or combinations of two or more thereof and the butyl groups may be n-butyl, isobutyl, sec-butyl, or combinations of two or more thereof. The repeat units derived from acid monoester can be present in the olefin copolymer, based on the concentration of monomer in the copolymer, $\geq$about 0.5, $\geq$about 1, $\geq$about 2, $\geq$about 3, $\geq$about 4, $\geq$about 5, $\geq$about 6, or even $\geq$about 8 wt %. Some of such olefin copolymers are commercially available as Fusabond® from E. I. du Pont de Nemours and Company, Wilmington, Del. (DuPont).

Any known copolymerization process can be used. For example, copolymerization can be carried out by continuously feeding ethylene, acid monoester, a free radical initiator, and optionally a comonomer and/or a solvent such as methanol or other solvent (see, e.g., U.S. Pat. No. 5,028,674 or U.S. Pat. No. 2,897,183, disclosures of which are incorporated herein by reference). Other high-pressure reactor designs with sufficient mixing, residence time, temperature and pressure control known in the art may be employed. It may be desirable to adjust the residence time and, in some cases, to use a telogen (chain transfer/chain terminating agent) such as propane to help adjust the molecular weight. The reaction mixture is continuously removed from the reactor. After the reaction mixture leaves the reaction vessel, the copolymer is separated from the unreacted monomers and solvent (if solvent was used) by, for example, vaporizing the unpolymerized materials and solvent under reduced pressure and at an elevated temperature. For example, the copolymerization can be carried out in a pressurized reactor at elevated temperature, from 150° C. to 300° C. or 150° C. to 250° C., and pressures of from 1500 to 2810 kg/cm$^2$ or 1665 to 2500 kg/cm$^2$, with feed temperatures from 30° C. to 90° C. or 50° C. to 90° C.

Olefin copolymer produced by grafting one or more monomers onto a polyolefin is well known to one skilled in the art and can be produced by any means known to one skilled in the art including thermal grafting in an extruder or other mixing device, grafting in solution or grafting in a fluidized bed reactor. Though the olefin copolymer can be produced by copolymerization of the olefin, monomer, and the optional comonomer or by grafting an olefin polymer with the acid monoester or an acid anhydride, an olefin copolymer produced by grafting process is discouraged.

Ethylene alkyl (meth)acrylate copolymer comprises repeat units derived from ethylene, alkyl (meth)acrylate, and an optional comonomer disclosed above wherein the alkyl moiety contains from 1 to 8 carbon atoms, either linear or branched chains. Alkyl (meth)acrylate comonomer may be incorporated into the ethylene/alkyl (meth)acrylate copolymer from 0.1 weight % up to 45 weight % of the total copolymer. For example, the alkyl (meth)acrylate comonomer can be present in the copolymer from 5 to 45, 10 to 35, or 10 to 28, weight %. Ethylene alkyl (meth)acrylate copolymers can be produced by processes well known in the art using either autoclave or tubular reactors as disclosed in U.S. Pat. Nos. 5,028,674, 2,897,183, 3,404,134, 5,028,674, 6,500,888 and 6,518,365. Examples of ethylene alky (meth)acrylate copolymers include ethylene acrylate, ethylene methyl acrylate, ethylene ethyl acrylate, ethylene butyl acrylate, ethylene n-butyl acrylate carbon monoxide, ethylene glycidyl methacrylate, or combinations of two or more thereof such as Elvaloy® commercially available from DuPont.

Ethylene vinyl acetate copolymer is a polymer well known to one skilled in the art. The relative amount of vinyl acetate comonomer incorporated into EVA can be from 0.1 weight % up to as high as 40 weight percent of the total copolymer or even higher. For example, EVA can have a vinyl acetate content of from 2 to 50% by weight, 10 to 40%, or 6 to 30% by weight. Example of EVA copolymer also includes ethylene/vinyl acetate/carbon monoxide. EVA may be modified by methods well known in the art, including modification with an unsaturated carboxylic acid or its derivatives, such as maleic anhydride or maleic acid. Examples of commercially available EVA includes Elvax® from DuPont. Optionally 10-80% of the vinyl acetate groups of EVA can be converted to hydroxyl groups.

An example of ethylene acid copolymer can be described as E/X/Y copolymer where E is ethylene, X can be at least one unsaturated carboxylic acid disclosed above, and Y is a softening comonomer such as alkyl acrylate, alkyl methacrylate, or combinations thereof. X can be present from about 3 to about 30, 4 to 25, or 5 to 20, weight % of the E/X/Y copolymer, and Y is from 0 to about 35, 0.1 to 35, or 5 to 30, weight % of the E/X/Y copolymer. Specific examples of acid copolymers include ethylene/(meth)acrylic acid copolymers, ethylene/(meth)acrylic acid/n-butyl(meth)acrylate copolymers, ethylene/(meth)acrylic acid/methyl(meth)acrylate copolymers, ethylene/maleic acid and ethylene/maleic acid monoester copolymers, ethylene/maleic acid monoester/n-butyl (meth)acrylate copolymers, ethylene/maleic acid monoester/methyl (meth)acrylate copolymers, ethylene/maleic acid monoester/ethyl (meth)acrylate copolymers, or combinations of two or more thereof such as Nucrel® commercially available from DuPont.

Ionomers can be prepared from the acid copolymer by treatment with a basic compound capable of neutralizing the acid moieties of the copolymer. The acid groups may be nominally neutralized, 100% or less than 100%, such as any level from about 0.1 to about 99 or 90%, about 15 to about 80%, or about 40 to about 75% with an alkaline earth metal ion, an alkali metal ion, or a transition metal ion including Li, Na, K, Ag, Hg, Cu, Be, Mg, Ca, Sr, Ba, Cd, Sn, Pb, Fe, Co, Zn, Ni, Al, Sc, Hf, Ti, Zr, Ce, or combinations of two or more thereof. Ionomers can also be prepared with nominal neutralization levels higher than 70% as disclosed above when blended with the organic acids. Examples of commercially available ionomers include Surlyn® from DuPont.

Processes for producing acid copolymer and ionomers are well known to one skilled in the art, the description of which is omitted herein for the interest of brevity.

Polyvinyl alcohol (PVOH) can include PVOH grades of about 70% hydrolysis or above, or of about 88% or above, or of about 99% or above. Fully hydrolyzed "100%" grades available commercially are actually about 98-100% hydrolyzed.

In percent hydrolysis, the percent refers to the molar proportion of vinyl alcohol moieties, the remainder being unhydrolyzed vinyl acetate moieties. Partially hydrolyzed grades of 80-98%, with 88% is common. Greater than 99% hydrolysis grades of PVOH are granular or fine powders and have thermal decomposition temperatures of about 200° C. and melting points of about 227° C. The 100% hydrolysis grade is highly crystalline and requires a temperature of about 80° C. for dissolution in water. The 88% hydrolysis grade, despite the higher acetyl group content, is soluble in water at room temperature, is much less crystalline, melts over a relatively broad temperature range around 185° C., and is less thermally stable than the 100% grade probably due to the residual 12% vinyl acetate component. The 70% hydrolysis grade, also granular, is markedly less water-soluble and less thermally stable probably due to the increased proportion of residual acetyl groups. It is known that random distribution of acetate groups in partially-hydrolyzed PVOH results in a larger melting point depression than is the case when the distribution of acetate groups is non-random; and commercial partially hydrolyzed PVOH has non-random acetate groups (R. K. Tubbs, J. Polymer Sci. Part A-1, 4, pp. 623-629 (1966)).

Examples of PVOH copolymers are copolymers with (meth)acrylate esters such as poly(vinyl alcohol-co-methyl methacrylate (PVOH/MMA), poly(vinyl alcohol-co-methyl acrylate), in which the (meth)acrylate comonomer molar proportion is from about 2% to about 10% or from about 2 to about 6 mol %, or combinations thereof. The (meth)acrylate fragment is known to be substantially in the γ-lactone form.

Because PVOH is well known and commercially available, the description of which is omitted herein for the interest of brevity.

Poly(hydroxyalkanoic acid) (PHA) comprises repeat units derived from hydroxyalkanoic acid having from 2 to 7 (or more) carbon atoms, such as polymer comprising 6-hydroxyhexanoic acid repeat units, also known as polycaprolactone, and polymers comprising 3-hydroxyhexanoic acid, 4-hydroxyhexanoic acid and 3-hydroxyheptanoic acid. Frequently used PHA comprises hydroxyalkanoic acids having five or fewer carbon atoms, for example, glycolic acid, lactic acid, 3-hydroxypropionate, 2-hydroxybutyrate, 3-hydroxybutyrate, 4-hydroxybutyrate, 3-hydroxyvalerate, 4-hydroxyvalerate and 5-hydroxyvalerate. Examples of PHA include poly(glycolic acid) (PGA), poly(lactic acid) (PLA), poly(hydroxybutyrate) (PHB), or combinations of two or more thereof.

PHA can be produced by bulk polymerization, through the dehydration-polycondensation of the hydroxyalkanoic acid, or through the dealcoholization-polycondensation of an alkyl ester of hydroxyalkanoic acid or by ring-opening polymerization of a cyclic derivative such as the corresponding lactone or cyclic dimeric ester. These processes are well known to one skilled in the art such as those disclosed in JP patent applications JP-A 03-502115, JP-A 07-26001, and JP-A 07-53684 as well as U.S. Pat. No. 2,668,162 and U.S. Pat. No. 3,297,033.

PHA polymers also include copolymers comprising more than one hydroxyalkanoic acid, such as polyhydroxy-butyrate-valerate copolymers and copolymers of glycolic acid and lactic acid. Copolymers can be prepared by catalyzed copolymerization of a polyhydroxyalkanoic acid or derivative with one or more cyclic esters and/or dimeric cyclic esters. Such comonomers include glycolide (1,4-dioxane-2,5-dione), the dimeric cyclic ester of glycolic acid; lactide (3,6-dimethyl-1,4-dioxane-2,5-dione); α,α-dimethyl-β-propiolactone, the cyclic ester of 2,2-dimethyl-3-hydroxy-propanoic acid; β-butyrolactone, the cyclic ester of 3-hydroxybutyric acid; δ-valerolactone, the cyclic ester of 5-hydroxypentanoic acid; ε-capro-lactone, the cyclic ester of 6-hydroxyhexanoic acid, and the lactones of its methyl substituted derivatives such as 2-methyl-6-hydroxyhexanoic acid, 3-methyl-6-hydroxyhexanoic acid, 4-methyl-6-hydroxyhexanoic acid, 3,3,5-trimethyl-6-hydroxyhexanoic acid, etc.; the cyclic ester of 12-hydroxydodecanoic acid; 2-p-dioxanone; and the cyclic ester of 2-(2-hydroxyethyl)-glycolic acid.

PHA compositions also include copolymers of one or more hydroxyalkanoic acid monomers or derivatives with other comonomers, including aliphatic and aromatic diacid and diol monomers such as succinic acid, adipic acid, and terephthalic acid and ethylene glycol, 1,3-propanediol, and 1,4-butanediol. Around 100 different monomers have been incorporated into PHA copolymers.

PHA polymers and copolymers may also be made by living organisms or isolated from plant matter. Numerous microorganisms have the ability to accumulate intracellular reserves of PHA polymers. For example, the copolymer poly(3-hydroxybutyrate-co-3-hydroxyvalerate) (PHB/V) has been produced by fermentation of the bacterium *Ralstonia eutropha*. Fermentation and recovery processes for other PHA types have also been developed using a range of bacteria including *Azotobacter, Alcaligenes latus, Comamonas testosterone* and genetically engineered *E. coli* and *Klebsiella*. See, e.g., U.S. Pat. No. 6,323,010.

PLA includes poly(lactic acid) homopolymers and copolymers of lactic acid and other monomers containing at least 50 mole % of repeat units derived from lactic acid or its derivatives and mixtures thereof having a number average molecular weight of 3,000 to 1,000,000, 10,000 to 700,000, or 20,000 to 600,000. For example, PLA may contain at least 70 mole % of repeat units derived from (e.g., made by) lactic acid or its derivatives. PLA homopolymers and copolymers can be derived from d-lactic acid, l-lactic acid, or a mixture thereof. A mixture of two or more poly(lactic acid) polymers can be used. PLA may be prepared by the catalyzed ring-opening polymerization of the dimeric cyclic ester of lactic acid, also referred to as "lactide." As a result, PLA is also referred to as "polylactide."

Polyester is a polycondensation product of an alcohol and an organic acid or salt thereof or ester thereof. Example of polyester includes polyethylene terephthalate (PET), poly (trimethylene) terephthalate, polypropylene terephthalate, polybutylene terephthalate, or combinations of two or more thereof or blends with additional components such as modifiers and tougheners. PET comprises (or is derived from) at least about 50 mole % PET and the remainder being derived from monomers other than terephthalic acid and ethylene glycol (or their ester forming equivalents). Other comonomers include for example diacids such as succinic acid, adipic acid, azelaic acid, sebacic acid, glutaric acid 1,10-decanedicarboxylic acid, phthalic acid, isophthalic acid, dodecanedioic acid, or combinations of two or more thereof; and ester forming equivalents thereof, diols such as propylene glycol, methoxypolyalkylene glycol, neopentyl glycol, trimethylene glycol, tetramethylene glycol, hexamethylene glycol, diethylene glycol, polyethylene glycol, cyclohexane dimethanol, or combinations of two or more thereof. Polyester has been extensively disclosed in, for example, U.S. Pat. Nos. 6,166,170; 6,075,115; 6,080,834; and 6,255,442 and is well known to one skilled in the art, the description of which is omitted herein for the interest of brevity.

Any polyamides produced from lactams or amino acids, known to one skilled in the art, can be used. Polyamides from single reactants such as lactams or amino acids, referred as AB type polyamides are disclosed in *Nylon Plastics* (edited by Melvin L. Kohan, 1973, John Wiley and Sons, Inc.) and can include nylon-6, nylon-11, nylon 12, or combinations of two or more thereof. Polyamides prepared from more than one lactams or amino acids include nylon 6,12.

Frequently used polyamides include nylon 6, nylon 7, nylon 8, nylon 11, nylon 12, nylon 6, 12, or combinations of two or more thereof especially nylon 6, nylon 11, nylon 12, or combinations of two or more thereof.

Well known polyamides can also be prepared from condensation of diamines and diacids, referred to as AABB type polyamides, including nylon 66, nylon 610, nylon 612, and nylon 1212 as well as from a combination of diamines and diacids such as nylon 66/610. Similarly, non-aliphatic polyamides including poly(m-xylene adipamide) (such as nylon MXD6 from Mitsubishi Gas Chemical America Inc.) or amorphous polyamide produced from hexamethylene diamine and isophthalic/terephthalic acids may not be as suitable as the AB type) such as Selar® PA from DuPont. Polyamides based on a mixture of nylon 66, 6 may be useful if the presence of nylon 66 is less than 40 wt %.

Because polyamide and process therefor are well known to one skilled in the art, the disclosure of which is omitted herein for the interest of brevity.

Any polyurethanes known to one skilled in the art can be used. Because it is well known to one skilled in the art, the description of which is omitted herein for the interest of brevity.

Polyolefin can include any polymer comprising repeat units derived from an olefin and includes polyethylene, polypropylene, polybutylene, polyisobutylene, and a copolymer of any of these polyolefins. Such copolymer can include comonomers including butene, hexene, octene, decene, dodecene, or combinations of two or more thereof.

Polycaprolactone, a biodegradable polyester with low melting point of about 60° C., can be produced from ε-capropactone by any means known to one skilled in the art.

Copolyetherester includes one or more copolymers having a multiplicity of recurring long-chain ester units and short-chain ester units joined head-to-tail through ester linkages. The long-chain ester unit chain ester units, or from about 25 to about 90 weight % short-chain ester units and about 10 to about 75 weight % long-chain ester units.

The copolyetheresters are disclosed in U.S. patents including U.S. Pat. Nos. 3,651,014, 3,766,146, and 3,763,109. A commercially available copolyetheresters from DuPont includes Hytrel® as well as copolyetherester obtained from oligomers of 1,3-propanediol. Others include Arnitel® from DSM in the Netherlands and Riteflex® from Ticona, USA.

Polyalkylene oxide can include polyethylene glycol, polypropylene glycol, oligomers of 1,3-propanediol, or combinations of two or more thereof.

The compositions can additionally comprise, about 0.001 to about 20 or up to about 60 weight % of the composition, one or more additives including plasticizers, stabilizers including viscosity stabilizers and hydrolytic stabilizers, antioxidants, ultraviolet ray absorbers, anti-static agents, dyes, pigments or other coloring agents, inorganic fillers, fire-retardants, lubricants, reinforcing agents such as glass fiber and flakes, foaming or blowing agents, processing aids, antiblock agents, release agents, fusion aid, process aid, calcium carbonate, calcium stearate, titanium oxide, stearic acid, paraffin wax, lubricants, pigments, surfactant, water, organic or inorganic salts, emulsifier, or combinations of two or more thereof. Optional additives, when used, can be present in various quantities so long as they are not used in an amount that detracts from the basic and novel characteristics of the composition.

The composition can be produced by any methods known to one skilled in the art such as standard mixing practices. This can be accomplished in a one-step or a two-step process. In the one-step process, all ingredients can be dry- or melt-compounded using a mixer such as Banbury mixer or twin screw or Buss kneader extruders. The mixing can also be carried out in a fluidized bed or other reactor. In the two-step process, blend including starch and the ethylene copolymer can be first prepared in a high intensity mixer such as a Welex mixer. In the second step, the blend is melt-blended with additives such as additive(s) and the modifiers in a melt compounding apparatus such as a Buss Kneader or a twin screw extruder. However, the composition is preferably produced by the process disclosed below.

The process includes premixing the modified starch, the olefin copolymer, and any other dry components to produce a mixture. This can be carried out in any conventional mixer. The mixture can be introduced into a screw extruder and subjected to elevated temperatures by the shearing action of the screw and the application of external heat to the barrel. The temperature can be raised to a range of about 140° C. to about 240° C. or about 160° C. to about 190° C. The material is manufactured by means of extrusion compounding, using co- or counter-rotating twin screw or selected design single screw extruders. Twin screw co-rotating compounding, with an extrusion pressure of at least about 5 or about 10 bar (1 bar=100 KPa) and with a screw speed of at least about 80 rpm or about 100 rpm.

Water can be introduced substantially simultaneously with the start of extrusion such as in the initial barrel sections by means of liquid injection for "gelatinising" (also referred to as destructurising, cooking, or melting) the starch into a polymeric gel structure. Water may also serve to dissolve any other water soluble polymers added, such as polyvinyl alcohol and to act as a plasticiser in the end-product thereby softening the material and reducing the modulus and brittleness. The melt and/or destructurised starch and copolymer blend can be then propelled toward the die and in moving forward the temperature can be reduced to prevent foaming without the need for venting. Alternatively, a foaming agent may be added to the combination during the process. Water may be added to a calculated concentration of about 10 to about 50, about 15 to about 45, about 20 to about 40, about 22 to about 40, or about 25 to about 35%, by weight of the total mixture or another mixture. Generally greater than 20% water can be included. Alternatively, water may be added at a rate of about 15 to about 45, about 20 to about 40, about 22 to about 40, or about 22 to about 35%, of the feed rate of the mixture.

Extruded products can be dried the extrudate or post-exit from the die down to a required moisture content of about 0.01 to about 10% or about 0.1 to about 5%, by weight of the final product. Removal of water may be carried out by means of convective drying, contact heating, IR heating, microwave drying, a centrifuge and a fluidised bed for granulate, barrel venting, or a combination of two or more thereof. Granulate may be obtained by means of underwater pelletising, die face cutting or strand cooling and cutting. A typical extrusion for rigid products can have the following parameters. Temperature profile of extruder barrels from feed throat to die in ° C. can be 40, 65, 80, 90, 100, 155, 170, 140, 120, 100 and screw speed can be about 450 rpm.

The extruded product may be recovered by any means known to one skilled in the art.

The composition, which may be biodegradable, may be used to make articles including films, sheets, molded articles, thermoformed articles, tubing, rods, or containers. The film include multilayer film or sheet and can be used as packaging materials for an aqueous medium, such as detergents, agricultural and pool chemicals, dyes and pigments, fillers, fragrances, and dry adhesives; packaging material or component of sanitary napkins and incontinence clothing; plantable seed packages such as seed tapes; barrier films; release films; garbage bags for compostable waste; medical laundry bags; laundry detergent pouches; packaging of food; or other packaging applications known to one skilled in the art.

The compositions may be formed into films and sheets by extrusion to prepare both cast and blown films. The compositions may be formed into cast films by extrusion through a slit die and calendering the resultant flat sheet. Blown films may also be prepared by extrusion through a circular or annular die to prepare a tubular film. For example but not limitation, the films and sheets are useful to prepare packaging material and packages. The sheets may be further thermoformed into articles and structures.

The films may comprise a single layer of the composition (a monolayer film). Alternatively, multilayer films or sheets comprise a layer of the composition and at least one additional layer comprising a different material. A film of the composition at about 250 μm (0.25 mm) thick may have a haze value of lower than about 23 or lower than about 16.

Any film-grade polymeric resin or material as generally known in the art of packaging can be employed to prepare additional layers in a multilayer film structure. A multilayer polymeric sheet may involve at least three categorical layers including, but not limited to, an outermost structural or abuse layer, an inner or interior barrier layer, and an innermost layer making contact with and compatible with the intended contents of the package and capable of forming any needed seals. Other layers may also be present to serve as adhesive or "tie" layers to help bond these layers together.

For example, a multilayer film may comprise layers ABCDE with additional optional layers where A and E or B and D can be the same or different and can comprise or be produced from one or more of the optional polymers. A can also be a water-resistant or structural layer comprising or produced from one or more polyolefins, polyesters, or combinations thereof. B can be a layer comprising or produced from the composition comprising a biopolymer, an ethylene copolymer, and optional polymer or additive as disclosed above. C can be a barrier layer comprising or produced from polyamide, vinylidene chloride copolymer, ethylene vinyl alcohol copolymer, polyvinyl chloride, paper, paper board, metal film such as aluminum foil, or combinations of two or more thereof.

For packaging applications, a multilayer film or sheet can comprise an outer layer and an inner layer (layer A or E) that can be a sealant layer comprising the composition disclosed above. B, C, and D may be the same or different and can be structural layer or layers having different functions such as permeability or barrier to air or water.

Specific examples of multilayer films can include polyolefin/ethylene alkyl acrylate copolymer/starch/ethylene alkyl acrylate copolymer/polyolefin, polyolefin/ethylene alkyl acrylate copolymer/starch/ethylene alkyl acrylate copolymer/polyester, polyester/ethylene alkyl acrylate copolymer/starch/ethylene alkyl acrylate copolymer/polyester, polyolefin/ethylene alkyl acrylate copolymer/starch/ethylene alkyl acrylate copolymer, or polyester/ethylene alkyl acrylate copolymer/starch/ethylene alkyl acrylate copolymer wherein the ethylene alkyl acrylate copolymer can be ethylene butyl acrylate glycidyl methacrylate copolymer, ethylene butyl acrylate carbon monoxide copolymer, ethylene vinyl acetate carbon monoxide copolymer, or combinations of two or more thereof.

A multilayer film can be prepared by coextrusion as follows: granulates of the various components are melted in separate extruders. The molten polymers are passed through a mixing block that joins the separate polymer melt streams into one melt stream containing multiple layers of the various components. The melt stream flows into a die or set of dies to form layers of molten polymers that are processed as a multilayer flow. The stream of layered molten polymers are cooled rapidly, for example, on a quench drum to form a layered structure. A film can also be made by (co)extrusion followed by lamination onto one or more other layers. Other suitable converting techniques are, for example, blown film (co)extrusion and (co)extrusion coating.

Films optionally may be uniaxially oriented (drawn in one direction) to provide high tensile strength in the machine direction (MD) such as is useful for tapes and straps. Alternatively, the film can be biaxially oriented by drawing in two mutually perpendicular directions in the plane of the film to achieve a satisfactory combination of mechanical and physical properties. Such biaxial stretching can be done sequentially such as first in the MD and then in the transverse direction, or simultaneously such as in the two perpendicular directions at the same time.

Orientation and stretching apparatus to uniaxially or biaxially stretch film are known in the art and may be adapted by those skilled in the art such as those disclosed in U.S. Pat. Nos. 3,278,663, 3,337,665, 3,456,044, 4,590,106, 4,760,116, 4,769,421, 4,797,235 and 4,886,634.

The film may also be laminated to a substrate such as foil, paper or nonwoven fibrous material to provide a multilayer packaging material. Lamination involves laying down a molten curtain of an adhesive composition between the substrate and the film moving at high speeds (from about 100 to 1000 feet per minute (fpm, 0.5-5 m/s) and preferably from about 300 to 800 fpm, 1.5-4 m/s) as they come into contact with a cold (chill) roll. The melt curtain is formed by extruding the adhesive composition through a flat die. Solution-based adhesive compositions may also be used to adhere the film to the substrate.

The packaging material may also be processed further by, for example but not limitation, printing, embossing, and/or coloring to provide a packaging material to provide information to the consumer about the product therein and/or to provide a pleasing appearance of the package.

Films and sheets can be used to prepare packaging materials and containers such as pouches, lidding, thermoformed containers such as trays, cups, and bowls. Other thermoformed packaging articles include blister packaging, blister components or pharmaceutical compartments for dispensers, clam shells, handling-trays, point-of-purchase display stands, two-pieces boxes (lid and base combinations), dispenser bodies, bifoldable articles, and the like.

Films may be processed into bags or pouches by forming seals (for example, by heat-sealing or radio-frequency welding) across the tube surface and cutting the sealed tube into lengths, thereby providing tubes with one closed end and one open end.

The composition may be molded into articles using any suitable melt-processing technique such as commonly used melt-molding methods known in the art such as injection molding, extrusion molding, or blow molding. An example is a package comprising a thermoformed container such as a tray, cup, or bowl and a lidding film comprising a film comprising the compositions.

The composition may be used as a tie layer, an interior layer having the primary purpose of adhering two layers to one another, in a multilayer film. The multilayer film can comprise layers comprising, or produced from, one or more polymers by any means known to one skilled in the art such as the one disclosed above. The one or more polymers can be the same as the optional polymers disclosed above.

EXAMPLES

The following examples illustrate, but are not to be construed as to unduly limit the scope of, the invention.

Material

Modified starch was Gelose 939, a high amylose starch, Gelose 80, with a quoted amylose content of 80%, modified by reaction with propylene oxide to give a 6.5% hydroxypropyl residue (by weight). It was obtained from Penford, Australia.

MAH1 was a copolymer of ethylene and butene produced via a metallocene catalyst process and grafted with 0.9% maleic anhydride with a melt index (MI) at 190° C. of 3.7 and mp 54° C. and density of 0.87 kg/dm$^3$ available from DuPont.

MAH 2 was a maleic anhydride-grafted copolymer of ethylene and 24 wt % methyl acrylate containing 1.8% maleic anhydride with a MI at 190° C. of 1.8 and mp 89° C. available from DuPont.

MAH 3 was a copolymer of ethylene and 9 wt % monoethylmaleate with a MI of 25 at 190° C. and mp 108° C. available from DuPont.

Elvanol® 71-30 was polyvinyl alcohol with 99.0-99.8% hydrolysis and 27.0-33.0 cP viscosity of a 4% aqueous solution, commercially available from DuPont.

Modified starch, olefin copolymer, polyvinyl alcohol (Elvanol® 71-30) and small amounts of processing aid were dry-mixed in a rotary mixer for a period of approximately 30 minutes to produce a pre-mix. The pre-mix was then fed into a 27 mm diameter co-rotating twin-screw extruder equipped with a sheet die, with injection of water, at approximately 25% of the total feed rate of all components, in an early barrel zone. Starch was cooked by the combined action of water, elevated temperature and shear provided by the screw. The olefin copolymer was melted by the thermal input into the extruder barrel and the polyvinyl alcohol was dissolved (in water). During and following cooking the extruder served to mix and homogenize the composition. A typical residence time in the extruder is between 1 and 2.5 minutes, depending on temperature profile and screw speed.

For Drop Test Scores, the compound was extruded into a sheet of about 250 μm (0.25 mm) thick, which was subsequently thermoformed into a chocolate tray of 13.5×13.5 cm. The cavities were filled with molded plastic pieces corresponding to the weight of chocolate pieces totaling 125 g and the filled tray, packaged in a secondary carton package was let drop down from a height of between 0.9 m (meter) and 1.5 m depending on the relative humidity conditions. Drop tests at 50% relative humidity (and 23° C.) were carried out from a height of 1.5 m, while at 35% relative humidity the packed trays were dropped from a height of 0.9 m. A total of 10 trays were dropped for each trial. The damaged trays were rated thereafter, according to the following scale and definitions, where each tray is fitted into the highest numbered (worst performing) category applicable.

In the following table, crack denoted running from the edge or inside the tray; chip was a piece missing from the edge of the tray; the size was the maximum dimension of the missing portion, not including any associated crack; hole occurred in the middle of a tray; and separated piece was a large piece that was 75% or more detached from the tray.

| Category | Defects | | | Number |
| | Crack size (mm) | Chip size (mm) | Hole size (mm) | Total allowable defects |
| --- | --- | --- | --- | --- |
| 0 | 0 | 0 | 0 | 0 |
| 1 | ≦10 | ≦5 | 0 | ≦2 |
| 2 | ≦30 | ≦20 | ≦10 | ≦4 |
| 3 | ≦30 | ≦20 | ≦10 | ≦6 |
| 4 | >30 | >20 | >10 | ≦4 |
| 5 | >30 | >20 | >10 | >4, or ≧1 separated piece |

Haze was determined according to the method of ASTM D1003 rev 92.

Sheet was made with three different olefin polymers, designated MAH 1, MAH 2 and MAH 3. The sheet made with the addition of MAH 1 was mottled with a large number of gels and had a two phase appearance, indicating incompatibility. Material made with MAH 2 and MAH 3 were thermoformed into trays and then drop tested as disclosed above. The results from drop tests at 50% relative humidity are shown in Table 1.

TABLE 1

| | Run No. | | | |
| | 1 | 2 | 3 | 4 |
| --- | --- | --- | --- | --- |
| Modified starch | 90.5 | 86 | 86 | 86 |
| Stearic Acid | 0.5 | 0.48 | 0.48 | 0.48 |
| MAH 1 | | 5 | | |
| MAH 2 | | | 5 | |
| MAH 3 | | | | 5 |
| Elvanol ® 71-30 | 9 | 8.55 | 8.55 | 8.55 |
| 50% RH Drop Test Score | | | | |
| | 2.6 | $M^1$, $NT^2$ | 2.3 | 0.5 |

[1]Mottled, 2-phase sheet
[2]NT, not tested

MAH 3 (copolymer) produced a good quality clear material with much improved drop test performance over the modified starch formulation without the inclusion of ethylene copolymer. MAH 2 (grafted monomer) produced a cloudy material with drop test properties comparable to that with no additive. Based on these and other results the olefin copolymer MAH 3 materials were tested at lower relative humidity levels as well as at higher addition levels, both with and without the inclusion of Elvanol® 71-30 polyvinyl alcohol. The results of the drop test at 35% relative humidity from a height of 0.9 m, as well as percentage haze values are given in Table 2.

TABLE 2

| | Run No. | | | |
| | 1 | 4 | 5 | 6 |
| --- | --- | --- | --- | --- |
| Modified starch | 90.5 | 86 | 82.4 | 90.5 |
| Stearic Acid | 0.5 | 0.48 | 0.46 | 0.5 |
| MAH 3 | | 5 | 9 | 9 |
| Elvanol ® 71-30 | 9 | 8.55 | 8.19 | |
| 35% RH Drop Test Score | | | | |
| | 5 | 1.6 | 2 | 1.2 |
| Haze (%) | | | | |
| | 16 | 16 | 23 | 16 |

The invention claimed is:

1. A composition comprising or produced from a biopolymer, an olefin copolymer, and an optional polymer wherein
the biopolymer includes a hydroxyalkyl-modified starch and is present in the composition in a concentration of about 85% or more, based on the total dry weight of the composition;
the olefin copolymer is produced by copolymerization of an olefin, a monomer, and optionally a comonomer;
the olefin includes ethylene, propylene, butylene, or combinations of two or more thereof;
the monomer includes maleic anhydride, maleic acid, salt of maleic acid, maleic acid diester, maleic acid monoester, itaconic acid, fumaric acid, fumaric acid monoester, or combinations of two or more thereof;
the optional comonomer includes (meth)acrylic acid, salt of (meth)acrylic acid, $C_1$-$C_8$ ester of (meth)acrylic acid, carbon monoxide, sulfur dioxide, acrylonitrile, glycidyl acrylate, glycidyl methacrylate, and glycidyl vinyl ether, or combinations of two or more thereof; and
the optional polymer includes ethylene copolymer, polyvinyl butyral copolymer, or combinations thereof; the ethylene copolymer includes ethylene alkyl(meth)acrylate copolymer, ethylene vinyl acetate copolymer, ethylene acid copolymer or ionomer thereof, poly(vinyl alcohol), poly(hydroxyalkanoic acid), polyester, polyamide, polyurethane, polyolefin, polycaprolactone, copolyetherester, polyalkylene oxide, or combinations of two or more thereof.

2. The composition of claim 1 wherein the olefin is ethylene and the monomer is maleic anhydride or maleic acid monoester.

3. The composition of claim 1 wherein the biopolymer is a hydroxypropyl-modified starch comprising repeat units derived from at least 65% of amylose, by weight of the starch; and the biopolymer is present in the composition from about 85% to about 95%.

4. The composition of claim 3 wherein the biopolymer comprises repeat units derived from at least 70% of amylose; the biopolymer is present in the composition from about 88% to about 92%; the olefin copolymer comprises ≧about 3.0% of repeat units derived from the monomer, based on the weight of the copolymer; and the olefin is ethylene and the monomer is maleic anhydride or maleic acid monoester.

5. The composition of claim 4 wherein the monomer includes methyl hydrogen maleate, ethyl hydrogen maleate, propyl hydrogen maleate, butyl hydrogen maleate, or combinations of two or more thereof.

6. The composition of claim 4 wherein the olefin copolymer further comprises the optional comonomer.

7. The composition of claim 5 wherein the olefin copolymer further comprises the optional comonomer.

8. The composition of claim 2 wherein the composition further comprises the optional polymer.

9. The composition of claim 4 wherein the composition further comprises the optional polymer.

10. The composition of claim 9 wherein optional polymer is an ethylene copolymer comprising repeat units derived from ethylene and alkyl(meth)acrylate, (meth)acrylic acid, glycidyl acrylate, glycidyl methacrylate, or combinations of two or more thereof.

11. The composition of claim 2 wherein the olefin copolymer is an olefin copolymer other than a maleic anhydride-grafted copolymer.

12. An article comprising or produced from a composition wherein the article includes film, multilayer film or sheet, or combinations thereof; the composition is as recited in claim 1 and the composition optionally further comprises one or more biodegradable polymers.

13. The article of claim 12 wherein the biopolymer comprises repeat units derived from at least 70% of amylose; the biopolymer is present in the composition from about 88% to about 92%; the olefin copolymer comprises ≧about 3.0% of repeat units derived from the monomer, based on the weight of the copolymer; the olefin is ethylene; and the monomer is maleic anhydride or maleic acid monoester.

14. The article of claim 13 wherein the composition further comprises the optional polymer.

15. The article of claim 13 wherein the article is the multilayer film or sheet comprising a layer of the composition and one or more layers produced from one or more polymers including poly(vinyl alcohol), poly(hydroxyalkanoic acid), polyester, polyamide, polyurethane, polyolefin, polycaprolactone, copolyetherester, polyalkylene oxide, polyvinyl chloride, paper, paper board, metal film, or combinations of two or more thereof.

16. The article of claim 13 wherein the multilayer film includes polyolefin/ethylene alkyl acrylate copolymer/the composition/ethylene alkyl acrylate copolymer/polyolefin, polyolefin/ethylene alkyl acrylate copolymer/the composition/ethylene alkyl acrylate copolymer/polyester, polyester/ethylene alkyl acrylate copolymer/the composition/ethylene alkyl acrylate copolymer/polyester, polyolefin/ethylene alkyl acrylate copolymer/the composition/ethylene alkyl acrylate copolymer, or polyester/ethylene alkyl acrylate copolymer/the composition, or combinations of two or more thereof where the composition further comprises the biodegradable polymers.

17. The article of claim 16 wherein the ethylene alkyl acrylate copolymer includes ethylene butyl acrylate glycidyl methacrylate copolymer, ethylene butyl acrylate carbon monoxide copolymer, ethylene vinyl acetate carbon monoxide copolymer, or combinations of two or more thereof; and each polymer or composition represents a layer derived from the polymer or composition.

18. The article of claim 13 wherein the article is converted to garbage bag, medical laundry bag, laundry detergent pouch, chemical bag, tray, cup, bowl, or a lidding material.

19. The article of claim 18 wherein the article is converted to garbage bag, medical laundry bag, laundry detergent pouch, chemical bag, tray, cup, bowl, or a lidding material.

20. A process comprising mixing a biopolymer, an olefin copolymer, optionally polymer, and further optionally an additive to produce a mixture, introducing water to the mixture to produce another mixture, and extruding the mixture or the another mixture at an elevated temperature wherein the biopolymer, the olefin copolymer, and the optional polymer are each as characterized in claim 1; the introduction of water is carried out prior to, or substantially contemporaneously with, the extruding; and the water introduced is at least 20% by weight of the another mixture.

* * * * *

UNITED STATES PATENT AND TRADEMARK OFFICE
CERTIFICATE OF CORRECTION

PATENT NO. : 7,740,952 B2  Page 1 of 1
APPLICATION NO. : 12/020318
DATED : June 22, 2010
INVENTOR(S) : Hausmann et al.

It is certified that error appears in the above-identified patent and that said Letters Patent is hereby corrected as shown below:

Claim 19, column 16, line 23, "the article of claim 18" should read --the article of claim 12--.

Signed and Sealed this
Third Day of May, 2011

David J. Kappos
*Director of the United States Patent and Trademark Office*